United States Patent [19]

Master et al.

[11] 4,019,600
[45] Apr. 26, 1977

[54] ANTI-NOISE MOUNTING MEANS FOR TRANSMISSIONS

[75] Inventors: Ralph E. Master, Washington; Arthur J. Ritter, Jr., Metamora; David L. Perry, Peoria, all of Ill.

[73] Assignee: Caterpillar Tractor Co., Peoria, Ill.

[22] Filed: June 9, 1975

[21] Appl. No.: 584,995

[52] U.S. Cl. .................. 180/70 R; 74/606 R; 181/33 K; 181/33 Q
[51] Int. Cl.² ................................. B60K 20/00
[58] Field of Search ............... 180/70 R; 74/606 R; 181/33 K, 62, 33 Q

[56] References Cited

UNITED STATES PATENTS

| | | | |
|---|---|---|---|
| 2,971,398 | 2/1961 | Sieving | 74/606 |
| 3,678,914 | 7/1972 | Vulliamy | 123/195 C |
| 3,695,386 | 10/1972 | Thien | 181/33 K |
| 3,773,142 | 11/1973 | Bragg | 181/33 K |
| 3,797,604 | 3/1974 | Davis | 296/35 R X |
| 3,810,519 | 5/1974 | Galos | 180/70 R |
| 3,822,763 | 7/1974 | Adams | 181/33 K |
| 3,828,873 | 8/1974 | Oestmann | 180/9.5 |
| 3,845,923 | 11/1974 | Atkinson | 248/3 |
| 3,902,567 | 9/1975 | Pekar | 180/70 R |

FOREIGN PATENTS OR APPLICATIONS 1,218,734  1/1971  United Kingdom

*Primary Examiner*—Joseph F. Peters, Jr.
*Assistant Examiner*—John P. Silverstrim
*Attorney, Agent, or Firm*—Phillips, Moore, Weissenberger Lempio & Majestic

[57] ABSTRACT

A mobile construction vehicle comprises a frame having a transmission assembly mounted on a rearward end thereof in cantilevered relationship. The transmission assembly comprises a bell housing solely mounted on an annular support of the transmission by first anti-vibration and noise suppressing means which isolates the housing from metallic contact with the support member. If so desired, second anti-vibration and noise suppressing means may be utilized to solely mount the support member on the frame to also prevent metallic contact therebetween.

1 Claim, 6 Drawing Figures

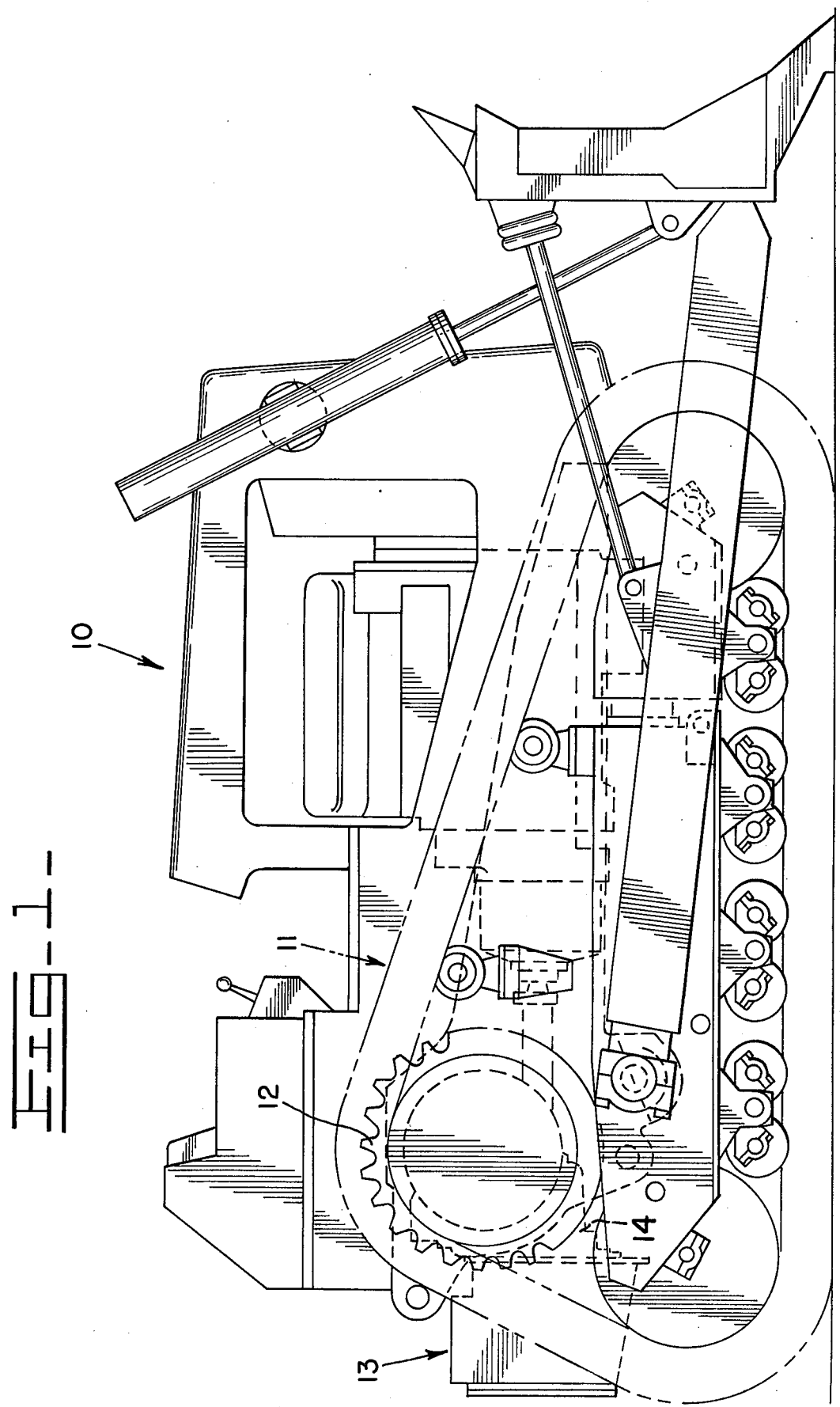

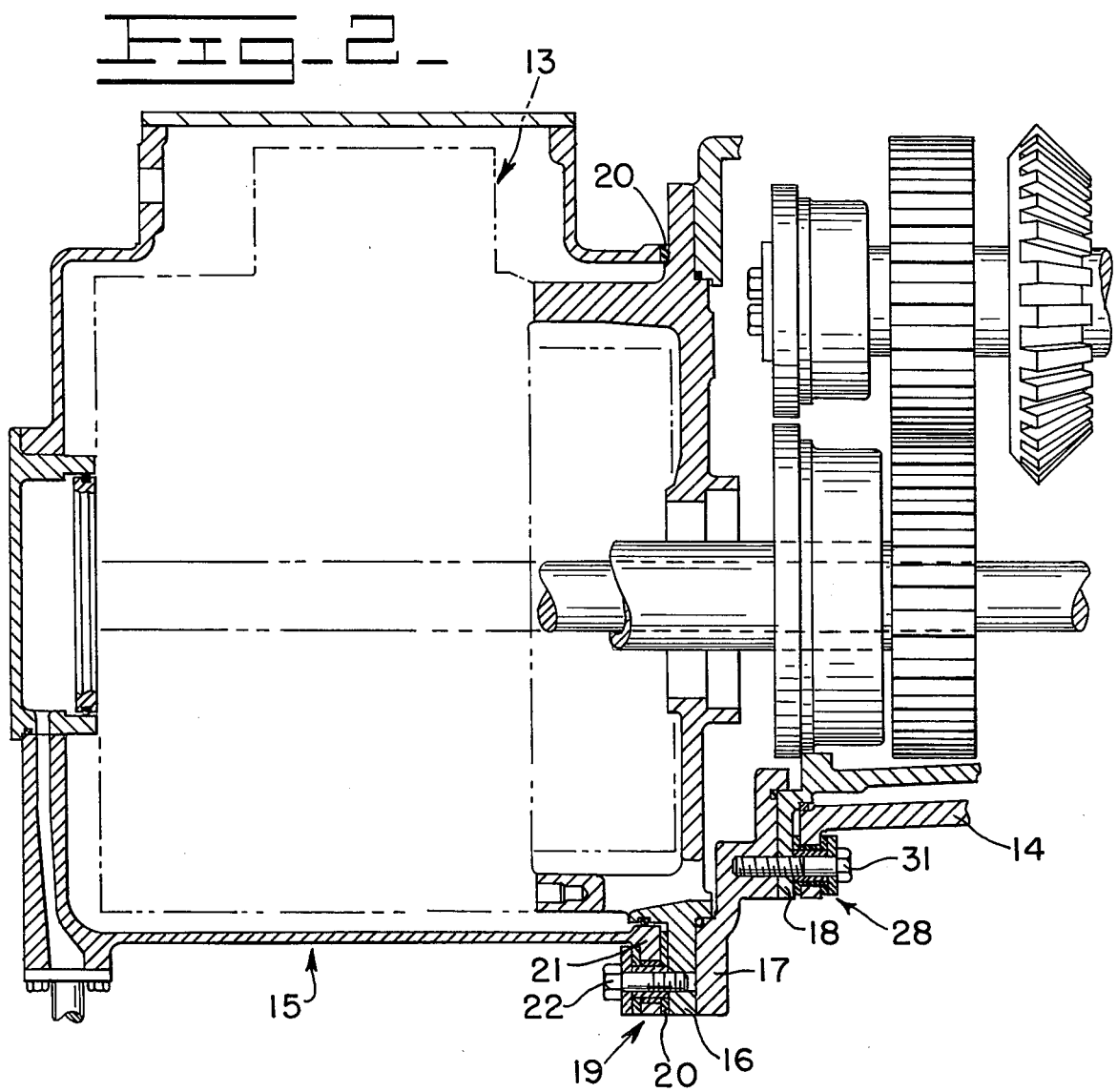
Fig_2_
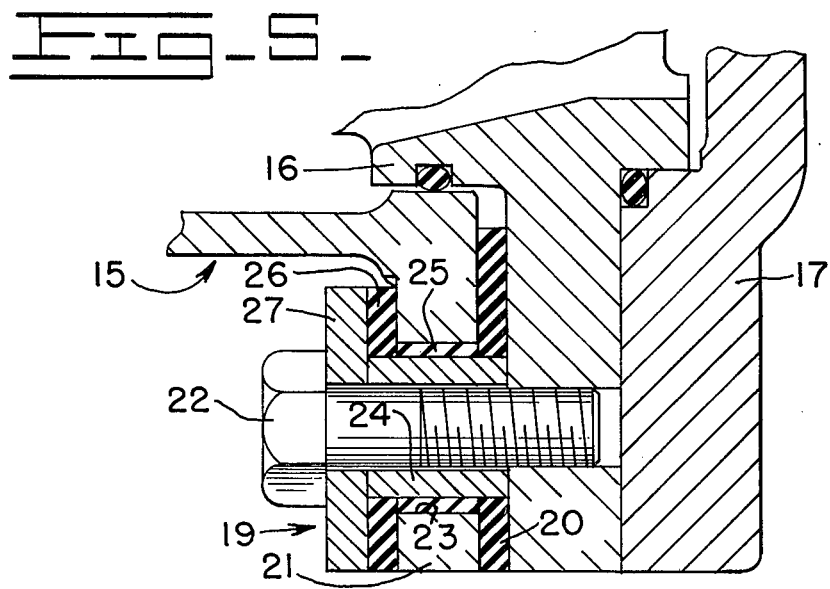
Fig_5_

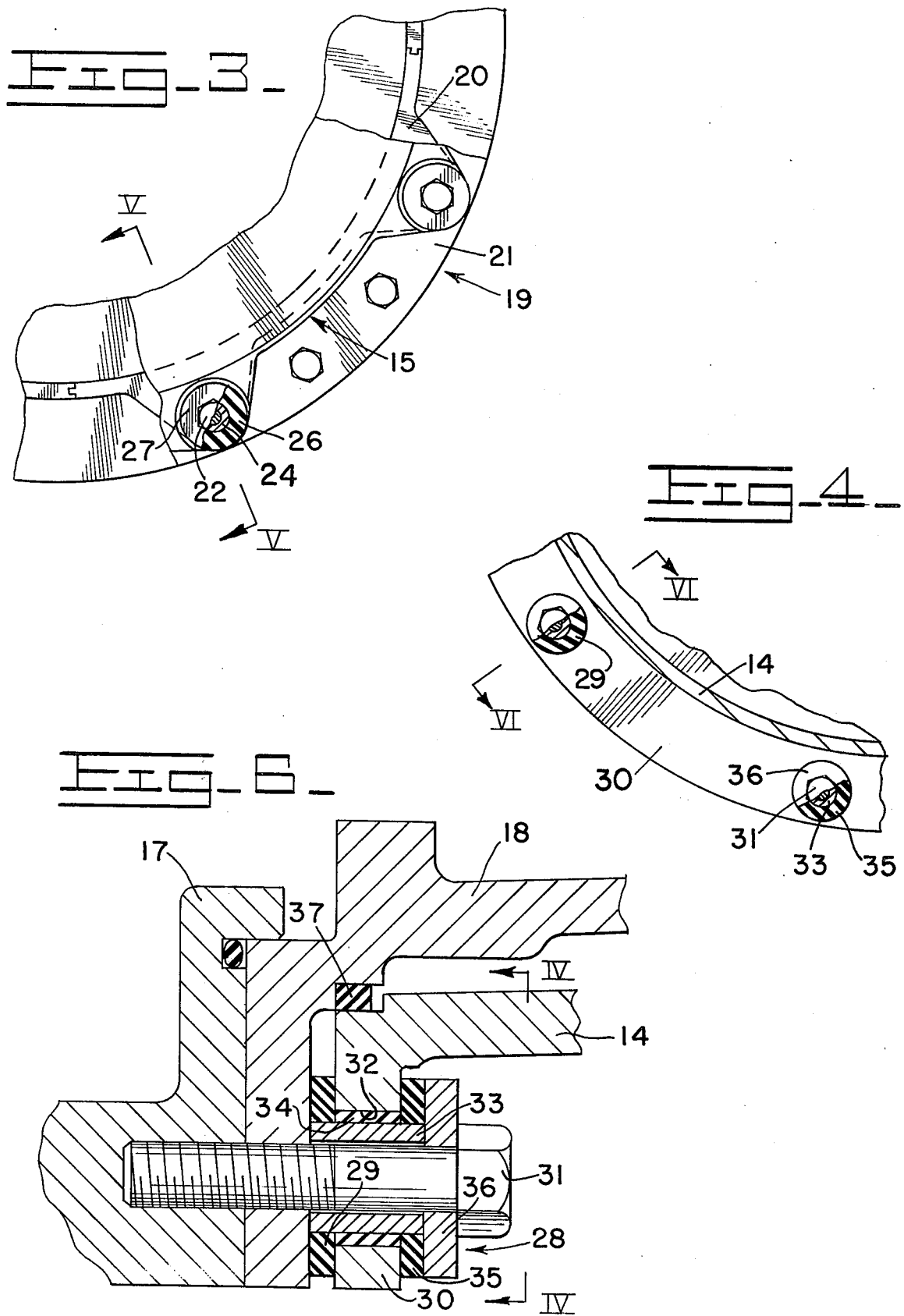

ANTI-NOISE MOUNTING MEANS FOR TRANSMISSIONS

BACKGROUND OF THE INVENTION

Transmissions for mobile construction vehicles, such as track-type tractors, tend to generate high noise levels. In addition, the transmission is normally mounted directly on the frame of the vehicle to subject it to vibrations occasioned during operation of the vehicle over uneven terrain and the like. The noise problem becomes particularly apparent with respect to a bell housing employed as a protective cover for the transmission which tends to function as a sounding chamber which amplifies the noise generated by the transmission.

SUMMARY OF THIS INVENTION

This invention relates to an improved mounting means for isolating the bell housing for a transmission from the transmission as well as the frame of a vehicle whereby the noise level externally of the transmission is greatly reduced and vibrations normally transmitted to the bell housing are substantially dampened. If so desired, the mounting means may further comprise means further mounting the transmission on the frame of the vehicle for isolating the transmission against vibratory energy generated in the frame.

BRIEF DESCRIPTION OF THE DRAWINGS

Other objects of this invention will become apparent from the following description and accompanying drawings wherein:

FIG. 1 is a side elevational view of a track-type tractor having a transmission mounted on a rearward end thereof by mounting means of this invention;

FIG. 2 is a longitudinal cross sectional view of the transmission and the mounting means therefor;

FIGS. 3 and 4 are partial elevational views of the mounting means, taken in the direction of arrows III—III and IV—IV in FIG. 2, respectively; and FIGS. 5 and 6 are enlarged sectional views of the mounting means, taken in the direction of arrows V—V and VI—VI in FIGS. 3 and 4, respectively.

DETAILED DESCRIPTION

FIG. 1 discloses a track-type vehicle 10 of the type disclosed in U.s. Pat. No. 3,828,873, assigned to the assignee of this invention. The vehicle essentially comprises an endless track assembly 11 suitably mounted on each side thereof and adapted to be driven by a sprocket 12. The sprocket, in turn, is selectively driven through a standard transmission assembly 13 mounted on a rearward end of a frame 14 of the vehicle.

Referring to FIGS. 2–6, the transmission assembly is surrounded by a metallic bell housing 15 attached in cantilevered relationship on support means of the transmission, comprising metallic support members 16, 17 and 18. The bell housing is attached in isolated relationship on support member 16 by first anti-vibration and noise suppressing means 19 of the mounting means comprising elastomeric pad means including an annular and irregular (FIG. 3) non-metallic sealing gasket 20 compressed between an annular flange 21 of the bell housing and member 16.

A plurality of circumferentially disposed bolts 22 each extend through a bore 23 formed through flange 21 and is threadably secured to member 16. A metallic bushing 24 is disposed on the shank of the bolt and functions as a spacer and stop means, as will be hereinafter more fully described. An annular non-metallic bushing 25 is mounted on bushing 24 along with a non-metallic washer 26.

Washer 26 is disposed between an outboard side of flange 21 and a metallic washer 27, the latter washer being disposed between an outboard end of bushing 24 and the head of bolt 22. It can be seen that upon the tightening of bolt 22 that metallic bushing 24, disposed axially between member 16 and washer 27, will function as a stop means to compress gasket 20, bushing 25 and washer 26 a predetermined maximum amount. The latter non-metallic gasket, bushing and washer may comprise a suitably composed material which will provide the anti-noise and vibration absorbing desiderata hereindescribed.

For example, such material may comprise suitably woven cotton fabric impregnated with an elastomer such as neoprene or chloroprene rubber. The density thereof may approximate 84.0 lbs./ft.$^3$ and the surface hardness thereof (Shore A) may approximate 90. The material may also exhibit an ultimate compressive strength approximating 18,000 psi, a compressive set at 500 psi approximating 3.0% maximum and a minimum tensile strength of 41,000 psi.

Referring to FIGS. 4 and 6, a second anti-vibration and noise suppressing means 28 may be utilized in certain transmission mounting applications, if so desired. Means 28 is preferably constructed and arranged similar to the above-described first means 19 to isolate the transmission support means from the frame and to further isolate bell housing 15 from the frame. In particular, a non-metallic washer 29 is compressed between a flange 30 of frame 14 and member 18 by a respective one of a plurality of circumferentially disposed bolts 31. The bolts each project through a bore 32 formed through flange 30 and each has a metallic bushing or stop means 33 mounted thereon.

A non-metallic bushing 34 is mounted on bushing 33 along with an annular non-metallic washer 35. A metallic washer 36 is mounted on the shank of bolt 31 to compress gasket 29, bushing 34 and washer 35 under a predetermined compressive load as dictated by the axial length of metallic bushing 33. A non-metallic ring 37 may be disposed between an inboard side of flange 30 and member 18 to form part of the second antivibration means, if so desired.

We claim:

1. In a mobile construction vehicle including a metallic frame, a transmission assembly mounted on said frame and a metallic bell housing mounted on said transmission assembly, the improvement comprising:
an annular flange on said bell housing, an annular flange on said transmission assembly, a plurality of first anti-vibration and noise suppressing means detachably connecting said bell housing flange to said transmission housing flange while preventing metallic contact therebetween, a first support member attached to said transmission assembly flange, a second metallic support member attached to said first support member, an annular flange on said frame, and a plurality of second anti-vibration and noise suppressing means detachably connecting said second support member to said metallic frame flange while preventing metallic contact therebetween, each of said first and second anti-vibration and noise suppressing means including elastomeric pad means.

* * * * *